United States Patent [19]

Chu et al.

[11] Patent Number: 4,946,908

[45] Date of Patent: Aug. 7, 1990

[54] BISMALEIMIDE COMPOSITIONS CONTAINING HIGH GLASS TRANSITION TEMPERATURE AND SOLUBLE REACTIVE OLIGOMERS AND COMPOSITES PREPARED THEREFROM

[75] Inventors: Sung G. Chu; Harold Jabloner; Tuyen T. Nguyen, all of Wilmington, Del.

[73] Assignee: Hercules Incorporated, Wilmington, Del.

[21] Appl. No.: 73,667

[22] Filed: Jul. 15, 1987

[51] Int. Cl.$^5$ .................. C08L 77/06; C08L 79/08
[52] U.S. Cl. ............................... 525/426; 525/436; 525/907; 525/928; 428/473.5; 428/474.4
[58] Field of Search ............... 525/426, 421, 907, 928, 525/436

[56] References Cited

U.S. PATENT DOCUMENTS

| | | | |
|---|---|---|---|
| 3,179,634 | 4/1965 | Edwards | 260/78 |
| 3,416,994 | 12/1968 | Chalmers et al. | 161/227 |
| 3,528,950 | 9/1970 | Lubowitz | 260/78.4 |
| 3,575,924 | 4/1971 | Lyon | 260/47 |
| 3,897,395 | 7/1975 | D'Alello | 260/63 |
| 3,970,714 | 7/1976 | Bargain | 525/426 |
| 4,035,345 | 7/1977 | Ducleaux et al. | 260/78 |
| 4,100,140 | 7/1978 | Zahir et al. | 526/90 |
| 4,110,294 | 8/1978 | Pickering et al. | 525/426 |
| 4,160,859 | 7/1979 | Remmer et al. | 528/322 |
| 4,298,720 | 11/1981 | Yamazaki et al. | 526/262 |
| 4,351,932 | 9/1982 | Street et al. | 526/262 |
| 4,362,832 | 12/1982 | Locatelli | 524/102 |
| 4,518,754 | 5/1985 | Locatelli et al. | 526/262 |
| 4,539,392 | 9/1985 | Kadio et al. | 528/336 |
| 4,579,773 | 4/1986 | Cole et al. | 428/260 |
| 4,654,407 | 3/1987 | Domeier | 526/262 |

OTHER PUBLICATIONS

Ghatge et al., J. Pol. Sci: Poly. Chem. Edition, vol. 18, 1905–1909 (1980).

*Primary Examiner*—Lewis T. Jacobs
*Assistant Examiner*—A. Carrillo
*Attorney, Agent, or Firm*—Edmund C. Ross, Jr.; Mark Goldberg

[57] ABSTRACT

Described are novel thermosetting maleimide compositions suitable for making cured resins, prepregs and tough thermoset composites. The thermosetting compositions comprise a multifunctional maleimide and terminally unsaturated polyamide, polyimide, or polyamideimide oligomer which is soluble in the composition. The cured resins have a fracture toughness, $K_{ic}$, of at least 1.0 MPam$^{\frac{1}{2}}$ and a glass transition temperature of at least 200° C.

9 Claims, 1 Drawing Sheet

BISMALEIMIDE COMPOSITIONS CONTAINING HIGH GLASS TRANSITION TEMPERATURE AND SOLUBLE REACTIVE OLIGOMERS AND COMPOSITES PREPARED THEREFROM

FIELD OF INVENTION

This invention relates to new thermosetting compositions useful in preparation of temperature resistant composites, such composites comprising high strength filaments and thermoset resin matrices that have been cured through crosslinking reactions involving multifunctional maleimides. More particularly, this invention relates to such thermosetting compositions which comprise certain terminally unsaturated oligomers and can yield high temperature composites having improvements in such properties as damage tolerance, short beam shear strength and thermocracking.

BACKGROUND OF THE INVENTION

Temperature resistant composites made using multifunctional maleimides are well known. (Multifunctional maleimides, as the term is used herein, means compounds having at least about two crosslinkable maleimide groups per molecule.) See, for example, U.S. Pat. Nos. 4,654,007, 4,644,039 and 4,618,652.

Thermosetting resin compositions comprising multifunctional maleimides of the prior art are potentially very valuable because the temperature resistant thermosets which result from curing them also have advantageous mechanical and chemical properties, including hot/wet properties.

One characteristic of the aforementioned prior art thermosetting compositions, however, is the high density of crosslinks resulting from addition polymerization and other crosslinking of the multifunctional maleimide. These densely crosslinked thermosets are accordingly susceptible to thermocracking during the curing operations and subsequent heating and cooling cycles. Moreover, thermoset composites comprising high strength filaments and thermoset resin matrices made using multifunctional maleimides, have suspect damage tolerance due to the brittleness of the densely crosslinked resin matrix.

Recently, efforts have been made to reduce the drawbacks of thermoset composites made with multifunctional maleimides. For example, U.S. Pat. Nos. 4,518,754 and 4,518,755 suggest use of other unsaturated monomers in combination with the multifunctional maleimide. Also, copolymerization with certain alkenylphenols or dialkenylphenol ethers as reactive diluents has been proposed (see U.S. Pat. No. 4,100,140). And copolymerization with N-vinyl-pyrolidin-2-one and acrylamide (U.S. Pat. No. 4,413,107) has been disclosed. Other exemplary approaches have included modifying the multifunctional maleimide itself (e.g. U.S. patent application No. 761,432, of Aug. 2, 1985 now U.S. Pat. No. 4,654,407) and the use of unsaturated oligomers in combination with multifunctional maleimide e.g. U.S. Pat. No. 4,647,615.

SUMMARY OF THE INVENTION

Now, in accordance with this invention, it has been found that thermosetting resin compositions comprising multifunctional maleimides, certain terminally unsaturated oligomers having glass transition temperatures, $T_g$, above about 200° and which are soluble in combination with the multifunctional maleimide and optionally a reactive diluent, yield upon curing in the presence of inorganic or organic fibers, thermoset composites having dramatically improved damage tolerance, short beam shear strength, and thermocracking characteristics while retaining high temperature performance and solvent resistance. The crosslinked thermosetting compositions (thermosets) in certain embodiments exhibit multiphase morphology in which two or more glassy phases of the cured resin are observable microscopically.

The thermosetting composition of this invention is prepared by mixing a multifunctional maleimide having the formula,

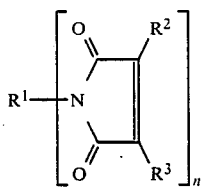

a terminally unsaturated oligomer and optionally a reactive diluent wherein $R^1$ is the residuum of an aryl, alkylaryl, or alkylamine or prepolymers thereof; $R^2$ is hydrogen, halogen, aryl, or lower alkyl group of from one to about ten carbon atoms; $R^3$ is hydrogen, halogen, aryl, or lower alkyl group of from one to about ten carbon atoms, and n is an integer of from 1 to about 10.

The terminally unsaturated oligomer is prepared by reacting a diamine or mixture thereof or a diisocyanate and a dicarboxylic acid derivative selected from dianhydrides, diacid chlorides, diacids, anhydride acid chlorides, anhydride acids or mixtures thereof. The resulting oligomer has terminal functionality dependent on the molar ratio of the reactants forming it. Terminal amine groups on the oligomer result from employing a molar excess of diamine in the reaction. Terminal carboxylic acid derivative groups result from employing a molar excess of the dicarboxylic acid derivative reactant in the reaction. Terminal isocyanate groups result when a molar excess of the diisocyanate is employed. Depending on the choice of dicarboxylic acid derivative chosen, imide, amide, or amideimide oligomers are produced. These intermediate oligomers are then reacted with an unsaturated organic compound containing functional groups which are reactive with the terminal functional groups of the intermediate oligomer, the unsaturated organic compound being called a complementary unsaturated organic compound.

The preferred terminally unsaturated oligomers of this invention are characterized as being oligomers selected from the general formulae C—(AB)$_y$—AC and C—(BA)$_y$—BC where A is the residium of A diamine, B is the residuum of a dicarboxylic acid derivative and C is the residuum of the complementary unsaturated compound and y ranges between 1 and 60.

DETAILED DESCRIPTION OF THE INVENTION

Figure 1:
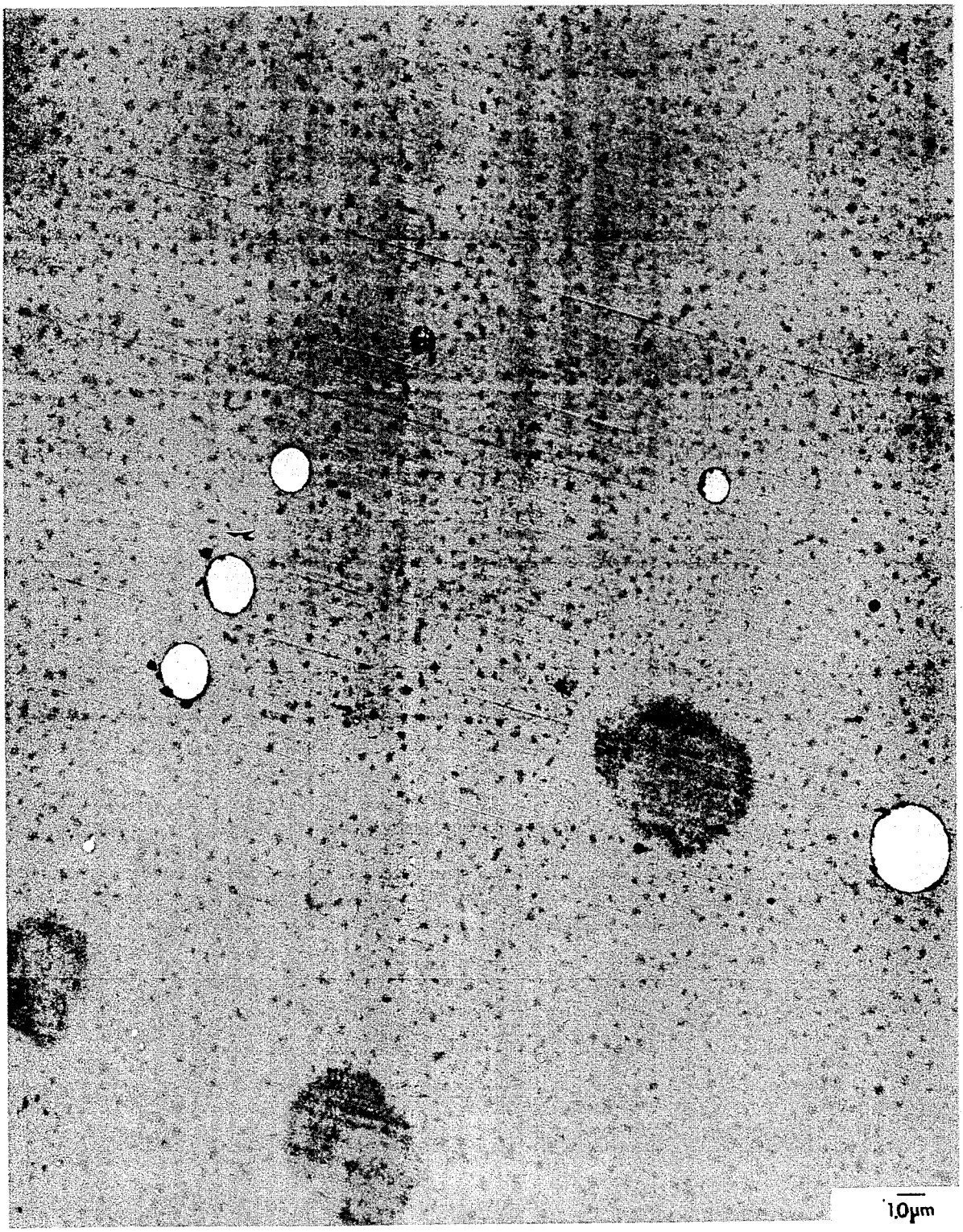

1. Preparation of Terminally Unsaturated Oligomers Using a Molar Excess of Amine Diamines employed in preparing the terminally unsaturated oligomer are alkylaryl diamines having the formulas,

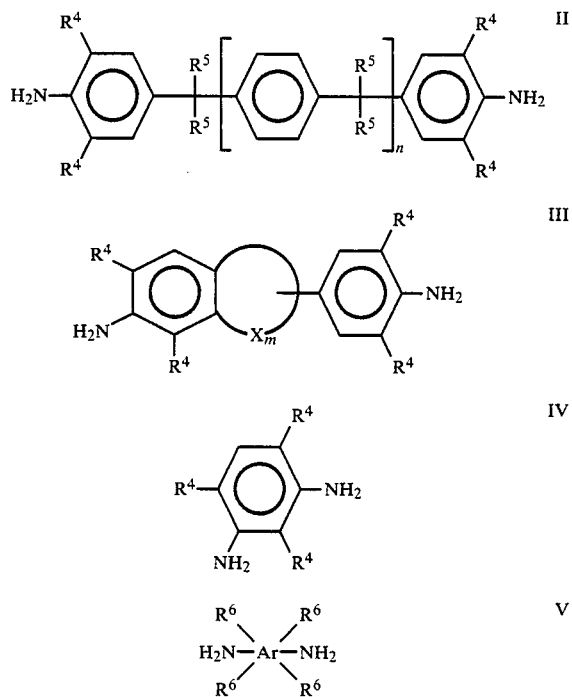

wherein $R^4$ is an alkyl, aryl, alkylaryl, halogen or hydrogen; $R^5$ is methyl or lower alkyl; n is 0 to 4; X is methylene and m is 3 to 6; Ar is an aryl or alkylaryl such as naphthalene, biphenyl, phenanthrene, 2,2-diphenyl hexafluoropropyl and the like, and $R^6$ is alkyl, aryl, arylalkyl, or halogen and the four $R^6$ groups are on adjacent carbon atoms to the two amine groups and such $R^6$ groups may be the same or different. (Diisocyanates which can be employed are diisocyanate derivatives of the amines mentioned above in which an isocyanate group (NCO) replaces each amine (NH$_2$) group in any of the compounds of formula (I), (II), (III), (IV) or (V).)

Dianhydrides, diacid chlorides or diacids, or acid anhydride acid chlorides or acid anhydride acids or mixtures thereof, dicarboxylic acid derivatives, which are used in preparing the terminally unsaturated oligomers are of the aryl or alkylaryl type and are well known in the art.

Preparation of Terminally Unsaturated Oligomers
Using An Excess of Diamine or Mixture Thereof In a first embodiment, a molar excess diamine or mixture thereof in relation to the dicarboxylic acid derivative is used in preparing an intermediate oligomer, and the resulting intermediate oligomer has amine end groups. The terminally unsaturated oligomer is prepared by reacting, generally in a second stage, the intermediate oligomer having terminal amine functional groups with a complementary unsaturated organic compound. Exemplary complementary unsaturated organic compounds are residia of maleic anhydride or its halide or alkyl, alkylaryl, or aryl derivatives; an unsaturated alkyl halide in which case the complementary unsaturated organic compound can be the residium of two of the same or different unsaturated groups; an unsaturated acid chloride; an unsaturated phosphoric halide; an unsaturated isocyanate; or an unsaturated sulfonyl chloride.

Preparation of Terminally Unsaturated Oligomers
Using An Excess of Dicarboxylic Acid Derivative In a second embodiment of this invention, a molar excess of the dicarboxylic acid anhydride is employed, and an intermediate oligomer with anhydride, acid chloride or acid groups or mixture thereof end groups results. One method by which the unsaturated oligomer is prepared is by reacting, simultaneously with the preparation of the intermediate oligomer having terminal carboxylic acid derivative end groups, said intermediate oligomer and a complementary unsaturated organic compound. Exemplary complementary unsaturated organic compounds are the residia of an unsaturated primary or secondary amines, unsaturated alcohols, or sulfides. If the carboxylic acid derivative terminal group of the intermediate oligomer is an anhydride and the complementary reactive organic group is a secondary amine, an alcohol or a thioester, the residium of the unsaturated reactive organic group is connected through an amide, ester, or thioester linkage. In this reaction the anhydride group reacts to form either (i) a diester, diamide or dithioester thus having two unsaturated complementary groups reacted per anhydride unit or (ii) an ester, amide, or thioester having one unsaturated complementary group reacted per anhydride and a residual unreacted acid group at the terminal site of the terminally unsaturated oligomer. The terminally unsaturated group is likely to be attached through an imide linkage when the acidic end group of the intermediate oligomer is an anhydride and the complementary reactive organic group is the residium of an unsaturated primary amine. (Other complementary unsaturated reactive groups are known to one skilled in the art and the terminal groups listed here are not meant to be exhaustive but to merely indicate the preferred embodiments of the invention.)

Generally in this case the unsaturated oligomer is prepared in a one step process in which the complementary organic reactive group is added to the reaction while the intermediate oligomer is being formed, although the reaction may be carried out in sequential steps, if desired.

The terminally unsaturated imide, amide or amideimide oligomers of this invention have glass transition temperatures ($T_g$) or from about 200° C. and are soluble in the thermosetting resins of this invention. The preferable $T_g$ of the terminally unsaturated oligomer will depend on the particular application intended but when the oligomer is used in carbon fiber composites for high temperature applications, the preferred $T_g$ is about 225° or higher. The number average molecular weight of the terminally unsaturated oligomers employed in preparing the thermosetting compositions of this invention is between about 2000 and about 60,000. The preferred molecular weight will depend on the application, but when the oligomers are used in carbon fiber composites, the preferred molecular weight is between about 5000 and about 10,000.

Use of Reactive Diluent

In certain cases especially when hot melt processes are used to prepare prepregs comprising the thermosetting compositions and fiber reinforcements as described in this invention, it is desirable to use an unsaturated reactive diluent along with the multifunctional maleimide and terminally unsaturated oligomer to aid in solubility of the terminally unsaturated oligomer, and processing of the prepreg. The unsaturated reactive diluents useful in this invention include materials such as methylpentadiene, divinylbenzene, acrylates, eugenol, and the like and preferably materials described by structures (VI) and (VII) below:

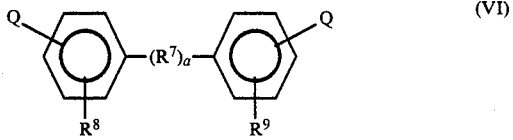

where $R^7$ represents one of the radicals

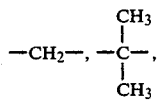

—$SO_2$—, —SO—, —S— and —O—; a is 0 to 1; and each Q is independently —OH, —$NH_2$, —SH, or hydrogen, and are the same or different and $R^8$ and $R^9$ are unsaturated alkyl groups having one to eight carbon atoms in the molecule and may be the same or different; and

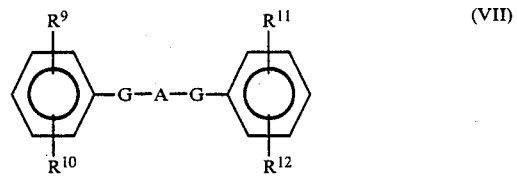

where $R^9$ and $R^{11}$ are unsaturated alkyl or aryl groups and may be the same or different, $R^{10}$ and $R^{12}$ are hydrogen, or alkyl or aryl ether groups and G is —O— or —S— or —NH—, and A is the residium of a dihalide.

Preparation of Reactive Thermosetting Resin Compositions, Prepreg and Composites The thermosetting compositions of this invention can be applied to the fibers, tows, whiskers, woven fabric or particulate filler by a number of techniques. Preferably hot melt coating and solvent coating techniques are used. The resulting uncured materials are prepregs. The prepregs are arranged into desired shapes and cured to form composite structures.

A. Preparation of Thermosetting Resin Composition

The thermosetting resin compositions of this invention are prepared by mixing about 10 to about 80 weight percent of terminally unsaturated oligomer or mixture thereof, preferably about 15 to about 50 weight percent, and about 20 to about 90 percent of a multifunctional maleimide or mixture thereof, preferably about 30 to about 50 weight percent and about 0 to about 60 weight percent, preferably about 20 to about 35 weight percent of an unsaturated reactive diluent or mixture thereof. The mixture is blended by stirring the components to give a paste, liquid, or in certain cases a solvent solution. If a solvent is used, the mixture is generally about 50 weight percent solids. The solvent is preferably methylene chloride, methylethylketone, tetrahydrofuran, diethylether, or other low boiling common organic solvent. If the blend is a paste, the paste is characterized by being a compatible blend of all ingredients with the reactive oligomer at the time of application not necessarily completely dissolved in the blend.

B. Preparation of Multifunctional Maleimides

The multifunctional maleimides useful in this invention are well known in the art and examples thereof are described in U.S. Pat. Nos. 4,389,516, 4,298,720, 4,035,345, 4,100,140. Briefly, the multifunctional maleimides useful in this invention are prepared by reacting a maleic acid or anhydride with a polyamine having at least two amino groups to prepare a polymaleimide acid and then dehydrocyclizing the polymaleimide acid. Any multifunctional maleimide may be suitably used in this invention either alone or in combination with other multifunctional maleimides. These are described by formula (I) above. Multifunctional maleimides which are particularly suited for use in this invention are benzene bismaleimide, p-diphenylmethanebismaleimide, phenylenediamine bismaleimide, 2,4-tolylenediaminebismaleimide, Technochemie 353, 795, 751 (commercial trade names for mixture of amino maleimides, bismaleimide, and chain extended maleimides reference Polymer Journal 1983, 15, p. 2) and diaminodiphenyl-sulfone bismaleimide.

C. Preparation of Terminally Unsaturated Oligomers

The reactive imide, amide or amideimide terminally unsaturated oligomers of this invention are prepared by procedures generally known by one skilled in the art. Briefly, these oligomers are made in a one step or two step process. Imide, amide or amideimide terminally unsaturated oligomer are prepared from amines, and anhydride, acid, acid chloride or anhydride-acidchloride or acids by choosing the proper mole ratio and mixing the diamine or mixture thereof with dianhydride; diacid chloride or diacid; or anhydride-acid chloride or acid or mixture thereof. The resulting intermediate oligomer is then reacted with the desired olefin which contains a complementary organic functional group which subsequently reacts in a high temperature curing reaction by free radical, Michael, "ene", or Diels-Alder reactions. In the case where the intermediate oligomer has anhydride, acid, acid chloride, or a combination thereof of end groups and the complementary unsaturated organic compound is an unsaturated amine, it is preferable to add the complementary unsaturated amine capping agent to the intermediate oligomer mixture while it is being formed. In the case where the intermediate oligomer has amine end groups and the selected complementary unsaturated organic compound is an unsaturated acid chloride, halide, sulfonyl chloride, isocyanate, and the like, it is preferable to prepare the oligomer and then add the unsaturated capping agent and continue the reaction to completion.

In the preferred embodiments of this invention, when the oligomer is an imide oligomer, the dianhydride is chosen so that at least 30 mole percent of one or more of the following dianhydrides is incorporated into the backbone of the imide oligomer: 3,3',4,4'-benzophenonetetracarboxylic acid dianhydride, 2,2-bis(3,4-benzene dicarboxylic acid anhydride) perfluoropropane; 2,2-bis (3,4-dicarboxyphenyl)propane dianhydride, bis(3,4-dicarboxylphenyl)ether dianhydride, 4,8-dimethyl-1,2,3,5,6,7-hexahydronaphthalene-1,2,5,6-tetracarboxylic acid dianhydride, 2,2-bis(2,3-dicarboxylphenyl)propane dianhydride, 1,1-bis(2,3-di-carboxylphenyl)ethane dianhydride,1,1-bis(3,4-dicarboxyphenyl)ethane dianhydride, bis(2,3-dicarboxylphenyl)methane dianhydride, bis(3,4-dicarboxylphenyl)methane dianhydride, 5-(2,5-dioxotetrahydro-3-furanyl-3-cyclohexene-1,2-dicarboxylic anhydride. The type of anhydride which can be used in combination with the already mentioned anhydrides are: pyromellitic dianhydride, 2,3,6,7-naphthalene tetracarboxylic acid dianhydride, 1,2,5,6-naphthalene tetracarboxylic acid dianhydride, 2,2'3,3'-diphenyltetracarboxylic acid dianhydride, 3,4,9,10-perylenetetracarboxylic acid dianhydride, naphthalene-1,2,4,5-tetracarboxylic acid dianhydride, naphthalene-3,4,5,8-tetracarboxylic acid dianhydride and 3,3',4,4'-diphenyltetracarboxylic acid dianhydride. These lists are not meant to be limiting of the anhydrides which are useful in this invention but to indicate the preferred embodiments of this invention.

In the preferred embodiments of this invention, when the oligomer is an amide, the acids or acid chlorides which are preferred are: isophthaloyl dichloride, terphthaloyl dichloride, phthaloyl dichloride, naphthaloyl dichlorides, anthraloyl dichlorides, pyridine dicarboxylic acid dichloride, biphenyloyl dichlorides, isophthalic acid, terephthalic acid, phthalic acid, naphthoic dicarboxylic acids, anthralic dicarboxylic acids, pyridine dicarboxylic acid, biphenyl dicarboxylic acids, stilbene dicarboxylic acids, diphenylsulfone dicarboxylic acids, diphenylether dicarboxylic acids, diphenylsulfidedicarboxylic acids, azodiphenyldicarboxylic acids, 2,2-diphenylhexafluoropropane dicarboxylic acids.

In the preferred embodiments of this invention, when the oligomer is an amideimide, the preferred anhydride acid chloride is trimellitic acid anhydride acid chloride and the preferred dianhydrides, diacids or diacid chlorides can be chosen from those already mentioned as preferred materials.

The diamines which are preferred for the incorporation into the polyimide, amide, and amideimide oligomers of this invention are represented by the materials of formulas II, III, IV and V above.

An especially prefered diamine is p-bis(4-isopropylidene-2,6-dimethylaniline)benzene. Other preferred diamines are 4,4'-isopropylidene di-2,6-xylidene, 4,4'-p-phenylenediisopropylidene dianiline,1-(4-aminophenyl)-2,3-dihydro)-1,3,3-trimethyl-1H-indenamine, 2,4-diaminomesitylene. In addition, isocyanates can replace the amine in reaction with dianhydrides to give imides which would have structures identical to those described herein.

When a molar excess of diamine or mixture thereof to dianhydride; diacid chloride or diacid; anhydride acid chloride or acid or dianhydride or (mixture) thereof is reacted, an oligomer containing amine end groups is formed and the preferable complementary reactive functional group of the reactive olefin is an alkyl halide, acid chloride, phosphoric halide, isocyanate or sulfonyl chloride.

Preferable unsaturated alkyl halides are allyl chloride or bromide, propargyl chloride, 1-chloro-3-butene, 1-chloro, 3,5-hexadiene (an unsaturated conjugated diene), chloromethylvinylbenzene, chlorocyclopentadiene, cinnamoyl chloride. Preferable unsaturated acid chlorides are acryloyl chloride, methacryloyl chloride, sorboyl chloride (an unsaturated conjugated diene), vinyl benzoyl chloride, cinnamoyl chloride. Other useful unsaturated conjugated diene acid chlorides are 3-methylbutadiene carboxylic acid chloride and 4-phenylbutadiene carboxylic acid chloride. Preferable unsaturated phosphonic halides are methyl-trivinylphosphonium iodide, 2-methylallyltriphenyl-phosphonium chloride, vinylphosphonic dichloride, triethylvinylphosphonium bromide. Preferable unsaturated isocyanates are isocyanatoethylacrylate or methacrylate, allyl isocyanate, 3,5 hexadienylisocyanate (an unsaturated conjugated diene), benzene, 1-isocyanato-2-(m-isopropenyl-phenyl) propane 2-isopropenylphenylisocyanate. A preferable unsaturated sulfonyl chloride is vinylsulfonylchloride.

When a molar excess of dianhydride; diacid or diacid chloride; or anhydride acid chloride or dianhydride diacid chloride or diacid to diamine is reacted, an oligomer containing anhydride, acid, acid chloride, or anhydride acid chloride or acid end groups is initially formed; and the preferred complementary reactive functional group of the reactive olefin can be a primary or secondary amine, an alcohol, or a sulfide. It is preferred, that when the reactive functional group is a primary amine, the unsaturated reactive olefin be added at the start of the oligomer preparation. Preferred amine capping agents are allyl amine, isopropenylaniline, m-allyloxyphenylaniline, aminofuran, (2-aminopropyl)isopropenylbenzene 2-propylaminophenol. Preferable alcohols are hydroxystyrene, allyl alcohol, sorbic alcohol (an unsaturated conjugated diene). Preferable sulfides are vinyl sulfide, alkylsulfide. Especially preferable are the oligomers which have isopropenyl aniline alloxyphenylaniline, sorbic acid, sorbic alcohol, or maleimide end groups. These preferable unsaturated materials are not mentioned to limit the invention but to give exemplary materials to the preferred embodiments of the invention.

D. Unsaturated Reactive Diluents

The reactive diluents useful in this invention are selected from a wide variety of unsaturated organic compounds and have one or more reactive unsaturated groups which react by a free radical, "ene", Diels-Alder, or Michael addition with the multifunctional maleimide and unsaturated, soluble imide oligomer. The reactive diluents must be soluble in the mixture of multifunctional maleimide and terminally unsaturated oligomer described herein. Some of the materials useful in this invention and used in polyimide systems are disclosed in U.S. Pat. Nos. 4,463,147, 4,100,140, 4,035,345, 4,298,720, 4,351,932. Other materials which are useful are well known in the art e.g. eugenol, divinyl benzene, methacrylates or acrylates, and 1,3-pentadiene. Still others are described by formula (VI) and (VII) above. The unsaturated reactive diluents can be used either alone or in combination with the multifunctional maleimides and unsaturated reactive oligomers of this invention. Particularly useful diluents of this invention are diallylbenzene, eugenol, isoeugenol, 1,3-pentadiene, 2-allylphenol, 2-propenylphenol,4-biseugen- oxybutane, 1,3-biseugenoxypropane, α,α-bis(o-allylphenoxy)-p-xylene, α,α-bis eugenoxy-p-xylene, allylphenylether. Most preferable reactive diluents are 2,2-bis(3-alkenyl-4-hydroxyphenyl)propane, α,α-bis(o-propenylphenoxy)-m-xylene, α,α-bis(o-propenylphenoxy)p-xylene, 4,4'-bis(o-propenylphenoxy)diphenylsulfone.

E. Preparation of Thermosetting Resin Composition and Prepreg

1. Hot Melt Coating Application

The thermosetting resin compositions for use in hot melt coating applications are prepared by dissolving about 10 to about 80 weight percent, preferably about 10 to about 50 weight percent of a terminally unsaturated oligomer in about 20 to 85 weight percent, preferably about 30 to 50 weight percent of the multifunctional maleimide and about 0 to 60 weight percent, Preferably about 20 to about 35 weight percent of a reactive diluent. The resulting paste or solution is then heated to 60°–100° C. for coating purposes.

2. Solution Coating Application

The thermosetting resin compositions for use in solution coating applications are prepared by dissolving the above mentioned ingredients in the proportions described in a low boiling, common organic solvent such as methylene chloride, acetone, methyl ethyl ketone, 1,1,1 tetrahydrofuran, or the like at about a 50% solids level. The solution is then applied to the fabric, fiber, or filler and the solvent evaporated.

3. Prepreg Formation

The prepregs of this invention comprise about 20 to about 50 weight percent, preferably about 25 to about 40 weight percent, of the thermosetting compositions herein described and about 50 to about 80 weight percent, preferably about 60 to about 75 weight percent of a high strength fiber such as glass, boron, or carbon, or filler such as cellulose, silica, and the like. The high-strength fiber is coated with the thermosetting compositions as a hot melt or solution using processing conditions known in the art.

A preferred manner of making the prepregs of this invention, when the fiber, is carbon fiber is by hot melt coating. This coating method is characterized by impregnating bands of fabrics of continuous fiber with the thermosetting composition in molten form. Generally for hot melt processing it is preferred to have a paste which becomes a liquid at about 60° to about 100° C. and has a viscosity of about 10,000 to about 100,000 centipoises (cps), more preferably between about 30,000 and about 70,000 cps at 100° C.

A preferred method of making the prepregs of this invention when the fibrous material is a glass fabric of woven nature is by solvent coating. In this process the glass woven fabric is passed through a solution of the thermosetting composition in a common organic solvent such as 1,1,1 trichloroethane, methylene chloride, tetrahydrofuran, methylethylketone or the like at about 50 weight percent solids and a viscosity of about 100 to about 1000 cps. The coated fiber is then passed through an oven at preferably about 150° to about 200° C. for a residence time of two to three minutes to remove the solvent. The resulting coated fiber is used to make composites.

Other processing techniques can be used to form the prepregs of this invention. For example filament winding, solvent coating, and pultrusion are typical processing techniques in which the thermosetting compositions of this invention can be used. When the fibers exist as bundles or when particulate fillers are used, the fibers or fillers can be coated with the thermosetting compositions, and layed up by filament winding or formed in a mold or be pressed into a sheet depending on the particular end use application.

F. Composite Preparation

The composites of this invention are prepared by stacking layer upon layer of the fiber prepregs where applicable, or by placing the coated filler or fiber in a mold. In the case where the fiber is carbon fiber the layup is preferably cured at 180° C. for two hours under vacuum at about 80 psi, then at 230° C. for two hours under free standing conditions, then at 250° C. for five hours under free standing conditions. The resulting composites have a $T_g$ greater than 200°, have excellent toughness, that is a $K_{IC}$ of greater than 1, have a post impact compression (PIC) value higher than 20 Ksi at 1000 lbs impact level and have good solvent resistance. When the fiber is glass, the layup is preferably cured at about 175° C. under about 40 to about 80 Ksi pressure with or without the presence of vacuum, then at about 220° C. to about 240° C. for 4 to 6 hours under free standing conditions.

The prefered thermosetting compositions are comprised of compositions which, when cured, produce resinous systems which are characterized by multiphase morphology comprising at least two glassy phases at least one of which is a discontinuous phase and one a continuous phase. Further, in the preferable embodiments of this invention the continuous phase comprises about 15 to about 30 percent of the volume of the cured composition and constitutes the majority of the reactive oligomer. The domains of the dispersed discontinuous phase are preferably between about one half to about four microns and more preferably between two to three microns. The domains are generally spherical or ellipsoidal in shape. The presence of fiber does not alter the formation of the phases. The cured resins are insoluble at room temperature in conventional solvents such as jet fuel, hydraulic fuel, acetonitrile, acetone, toluene, methylene chloride, water and the like.

The preferred crosslinked thermosetting composition of this invention, when carbon fiber is the fiber of choice, are also characterized by a $T_g$ of at least 150° C. and preferably above 200° C. and a fracture toughness of at least 0.8 MPam$^{\frac{1}{2}}$ (where MPa is megapascals and m is meters). The most preferred crosslinked resins for this application have a fracture toughness of 1.0 MPam$^{\frac{1}{2}}$ or greater and a cohesive fracture energy, $G_{IC}$, of at least 200 j/m$^2$ (where J is joules and m is meters). The preferred composites, when the fiber is carbon fiber, have a post impact compression (PIC) at an impact energy of 1500 inch-pounds per inch thickness of at least about 20 and more preferably at least about 30 ksi, as determined according to NASA publication 1092, using 32 ply quasiisotropic laminates.

G. Test Methods

The following test procedures were employed in determining fracture energies ($G_{IC}$) and critical stress intensity factors ($K_{IC}$) of the cured resins produced from the compositions of this invention. The mechanical strength of the cured resins was quantified in terms of the mode I cohesive fracture energy, $G_{IC}$ in j/m$^2$ or the mode I critical stress intensity factor, $K_{IC}$ in megapascals (MPa) times meters (m) to the one half power (MPam$^{\frac{1}{2}}$). The two are related through the following well known relationship which may be found in *Fundamentals of Fracture Mechanics* by J. F. Knott, Buttersworth, London (1973).

$$K_{IC} = (G_{IC}E)^{\frac{1}{2}}$$

where E is Young's modulus, determined in accordance with ASTM D638. $G_{IC}$ or $K_{IC}$ can be quantified via numerous test methods such as compact tension, double cantilever beam, double torsion and single edge notch. The cured resins were tested herein using a double torsion fraction test as described in *Fracture of Engineer-*

*ing Brittle Materials,* Ayal de S. Jayatilaka, Applied Science Publishers Ltd., London (1979).

In carrying out the test, the resin was cast in a 0.125 inch thick panel and the panel milled to yield a number of 1.75 inch by 5 inch by 0.125 inch rectangular bars. A 45 degree diamond-coated saw blade was used to cut a 0.042 inch deep groove down the center of the rectangular bar on both sides. At 0.75 inch from one end, the groove depth on both sides is gradually increased such that the remaining thickness at that end in the center of the grooves is near zero. A pre-crack about 0.75 inch long from the near zero thickness edge is formed by wedging a sharp razor blade into the groove at the end where the thickness between the grooves ($T_c$) is near zero. This specimen is called a double torsion bar.

The double torsion bar sample is placed into a screw driven INSTRON ® equipped with a compression load cell and a bottom compression platen. The double torsion bar rests on two rollers on the compression platen with the length axis of the bar parallel to the rollers. The bar is positioned such that the groove is equidistant from the rollers and that the front end is the end with the near zero remaining thickness. The rollers lay in small depressions in the platen and raise the sample by about 0.15 to 0.2 inch above the platen thus allowing the bar to deform in torsion.

The bar is loaded by the downward motion of the crosshead at a rate of 0.05 inch per min. The loading spheres of the INSTRON ® hit the top bar surface about 0.25 inch from the front end of the bar. The $P_{IC}$, critical crack propagation load is obtained from the load/time plateau resulting from the load-deflection curve. $K_{IC}$ is calculated by the formula $$K_{IC} = \sqrt{\frac{3 P_{IC}^2 M^2 (I + v)}{T_C T^3 w}}$$

where M is the momentum of the torsion which is one-half the distance between the rollers, v is Poisson's ratio which is about 0.35, W is the width of the double torsion bar, T is the double torsion bar thickness, $T_c$ is the thickness of the bar between the center line groove but outside the pre-crack region.

At least three tests were made and the sample mean and standard deviation determined. $G_{IC}$ was then calculated using the previously shown relationship between $G_{IC}$ and $K_{IC}$. The modulus, E was calculated from the shear storage modulus, $G'(\omega)$ assuming Poisson's ratio to be 0.35. $G'(\omega)$ was determined at $\omega = 10$ rad/sec and about 22° C. with a Rheometrics Mechanical Spectrometer and is reported in gigapascals(GPa).

To observe the glassy phases of the cured resins and composites prepared using the thermosetting compositions of this invention, carbon fiber composite and neat cured resin samples were thin sectioned at room temperature using a diamond knife. Thin sections (0.6-0.8 micron thick) were stained with $RuO_4$ vapor for four minutes before being examined by a transmission electron microscopy (TEM) to determine morphology.

The procedure used for preparing the sections for transmission electron microscopy examination follows. A sample of the cured resin or composite cut to about a 2×2×10-mm size was placed in a metal chuck and attached to a microtomer (LBK Ultratome V). The sample was prepared for microtoming by first trimming the area to be thin sectioned into the form of a trapezoid using a glass knife. The trapezoidal shaped blockface was less than one millimeter in diameter. The glass knife was replaced with a diamond knife (Sorvall-DuPont) and the trough attached to it was filled with distilled water. As the thin sections (600 to 800 Angstroms) were cut, they were floated in a ribbon pattern on the water surface. The sections were picked up using 300-mesh copper grids and allowed to air-dry. The grids containing the thin sections were attached to a glass microscope slide and placed in a staining dish containing 2% aqueous $RuO_4$ (Aesar) for 4 minutes. The glass slide was removed from the staining dish and the slide was placed under a hood to remove the last traces of any $RuO_4$. The stained microtomed sections were examined using a Zeiss EM-10 transmission microscope at 60 KV and electron photomicrographs were taken at 2000X and 5000X, and then enlarged to 6000X and 15,000X, respectively.

The glass transition temperature, dry modulus, and wet modulus values of neat cured resin and carbon fiber composite samples were obtained using a Rheometrics Dynamic Spectrometer (RDS). All measurements were made in the temperature sweep mode at a frequency of 10 rad/sec. The strain applied to the torsional rectangular test samples (2.5"×0.5"×0.0125") was kept within 0.2% to insure that the measurements were in the linear viscoelastic range. The intersection of the tangents of the slopes of the storage modulus (G') curve obtained from the RDS's was defined as the glass transition temperature (Tg) of the sample. Using the above procedures, a distinct Tg for each phase of the cured resin is not observed in those cases where the separate phases have Tg's within about 15° C. of each other.

The following examples illustrate this invention but are not meant to limit the scope of the invention. In these examples, unless stated otherwise, all parts and percentages are parts and percentages by weight. Molecular weight ($M_n$) values were calculated from end group analysis using the formula $M_n = 2000/meq$, where meq equals total milli-equivalents of end groups by analysis, unless otherwise indicated.

In the Examples which follow the reagents and solvents used were as described below:

p-Bis (4-isopropylidene-2,6-dimethylaniline) benzene (EPON HPT 1062): Purchased from Shell Chemical Co. and recrystallized from ethanol at the concentration of 100 parts of the amine to 1000 parts of ethanol.

3,3',4,4'-Benzophenonetetracarboxylic dianhydride (BTDA): Purchased from Allco was used as received and said to be 99% purity.

2-Isopropenylaniline: Purchased from Aldrich Chemical Co. and used as received and said to be 98 plus percent pure.

2-Methoxyethyl ether (diglyme): Purchased from Aldrich Chemical Co. and dried over 3A molecular sieves.

Toluene: Technical grade toluene was stored over 3A molecular sieve.

Methanol: Technical grade methanol was used as received.

Methylene chloride: Technical grade methylene chloride was dried over 3A molecular sieve before use.

Nitrogen: Nitrogen gas was passed through a 3A molecular sieve and Ridox column before use.

1-Methyl-2-pyrrolidinone (NMP): Spectrophotometric grade was dried over 3A molecular sieve before use.

Also, in the Examples, "SEC" means size exclusion chromotography, "conc" means concentration, "DSC"

means differential scanning calorimetry, $M_n$ is number average molecular weight, $M_w$ is weight average molecular weight, $M_z$ is Z average molecular weight and $P_1$ is molecular weight distribution.

EXAMPLE 1

Synthesis Of Carboxylic Acid Terminated Imide Oligomer Reacted With 2-Isopropenylaniline A mixture of p-bis-(4-isopropylidene-2,6-dimethylaniline) benzene (1085 g, 2.713 mol), 2-isopropenylaniline (119.35 g, 0.9 mol) and diglyme (5800 cc) was sparged with nitrogen for thirty minutes in a twelve liter flask equipped with a mechanical stirrer, two dean-stark traps and two condensers and a nitrogen bubbler. To this solution was added BTDA (1020 g, 3.17 mol) and diglyme (200 cc). The reaction was stirred at room temperature for four hours. Toluene (1000 cc) was added and the contents azeotroped overnight. The oligomer was precipitated and coagulated in methanol to give a pale yellow solid. The solid was filtered, washed, and dried in a vacuum oven at 90° C. overnight and then dried at 120° C. one more day. The oligomer obtained (2004 g, 96% yield) had a $T_g$ (DSC) of 244° C.; $NH_2$ (conc) of 0.05 meq/g; COOH (conc) of 0.13 meq/g; $M_n$ of $2.69 \times 10^3$; $M_w$ of $1.38 \times 10^4$; $M_z$ of $2.5 \times 10^4$; $P_I$ of 5.12.

EXAMPLE 2

Synthesis Of Amine Terminated Imide Oligomer Reacted With Sorboyl Chloride

A solution of p-bis-(4-isopropylidene-2,6-dimethylaniline) benzene (500 g, 1.25 mol) in diglyme (1500 cc) and N-methylpyrridone (Aldrich) (1000 cc) was added to a five liter flask equipped with a mechanical stirrer, a Dean-Stark trap and a condenser. The solution was stirred at room temperature for 50 min. under nitrogen. A solution of BTDA (345 g, 1.071 mol) in 500 cc of N-methylpyrridone was added to the reaction solution. This was stirred at room temperature for three hours. Toluene (500 cc) was added and the mixture was azeotroped overnight. The reaction was cooled to 40° C. and pyridine (50 cc) and sorboyl chloride (60 g, 0.46 mole, 29% excess prepared by adding 1.03 equivalents of oxalyl chloride dropwise to a slurry of potassium sorbate in an inert solvent such as hexane, benzene, methylene chloride, etc. at 5°–15° C. under anhydrous conditions, filtering the formed potassium salt, and distilling the sorboyl chloride at 110° C. at 40 mm Hg. to give a 70–90% yield) were added to the reaction. This was stirred at 100° C. for 3 days. The oligomer was coagulated in methanol to give a beige solid. The solid was filtered, washed, and dried in the vacuum oven at 90° C. overnight and at 140° C. for 6 hours. The oligomer (814 g, 96% yield) had a $T_g$(DSC) of 256° C.; a $NH_2$ (conc) of less than 0.01 meq/g; a COOH (conc) of 0.02 meq/g; and a NMR (wt % olefinic hydrogen) of 0.20%.

EXAMPLE 3

Synthesis Of Amine Terminated Imide Oligomer Reacted With Sorboyl Chloride

A solution of p-bis-(4-isopropylidene-2,6-dimethylaniline) benzene (500 g, 1.25 mol) in diglyme (1500 cc and n-methylpyrridone (1000 cc) was added to a five liter flask fitted with a mechanical stirrer, a Dean-Stark trap and a condenser. The solution was sparged and stirred at room temperature for thirty minutes. A solution of BTDA (345 g, 1.07 mol) and diglyme (500 cc) was added and the reaction was stirred at 35°–40° C. for two hours. Toluene was added and the contents were azeotroped overnight. The solution was cooled to 75° C. and pyridine (70 cc) and sorboyl chloride (51 g, 0.39 mole, 10% excess) was added. The solution was stirred at 60°–70° for two hours. The solution was diluted with toluene (solution/toluene ratio was 2/1) before coagulating in methanal to give a pale yellow solid. The solid was filtered, washed with methanol and dried in a vacuum oven at 100° C. overnight and at 150° C. for two hours. The oligomer (784 g, 88% yield) had a $NH_2$, (conc) of 0.01 meq/g; aC))H (conc) of 0.05 meq/g a $M_n$ of $6.65 \times 10^3$; a $M_w$ of $1.67 \times 10^4$; a $M_z$ of $2.86 \times 10^4$; and a $P_I$ of 2.51.

EXAMPLE 4

Synthesis Of Amine Terminated Amidimide Oligomer Reacted with Sorboyl Chloride A solution of p-bis-(4-isopropylidene-2,6-dimethylaniline) benzene (100 g, 0.25 mole) in diglyme (500 cc) and triethylamine (32 cc) was added to a two liter round bottom flask fitted with a mechanical stirrer, a Dean-Stark trap, a condenser and a nitrogen inlet-outlet tube. To this solution was added trimellitic anhydride (46.8 g) in several portions and then N-methylpyrolidone (300 cc) was added. After three hours at 45°–50° C., toluene (100 cc) was added and the contents heated to the boiling point overnight under azeotroping conditions. The reaction was cooled to 65° C. and pyridine (10 cc) and sorboyl chloride (8 g) was added to the reaction mixture. After two hours the reaction mixture was coagulated in methanol (one part reaction mixture to five parts methanol). The fine solid was collected by filtration. The solid was washed five times with methanol and dried in a vacuum oven at 140° C. to give a powder (120 g, 90% yield). The oligomer had a $T_g$ of 250° C.; a $NH_2$ (conc) of 0.23 meq/g; and a COOH (conc) of 0.1 meq/g.

EXAMPLE 5

Synthesis Of Amino Terminated Amide Oligomer Reacted With Sorboyl Chloride

A solution of p-bis-(4-isopropylidene-2,6-dimethylaniline) benzene (30 g, 0.075 mole) in N-methylpyrridone (400 cc) and 30 cc of triethylamine was added to a one liter round bottom flask fitted with a mechanical stirrer. To this mixture isophthaloyl dichloride (13.8 g, 0.068 mole) was added in portions at such a rate that the reaction temperature did not exceed 40° C. After three hours, two grams of sorboyl chloride was added the contents were stirred for another hour. The contents of the flask were coagulated in methanol (a part reaction mixture to five parts methanol). The solid was collected by filtration, washed with methanol, and dried under vacuum at 100° C. to give 39 g (98% yield). The polymer had a $T_g$ of 253° C.

EXAMPLES 6–20

Preparation And Physical Property Determination Of Carbon Fiber Composites With Thermosetting Composites Containing Terminally Unsaturated Oligomer The polymers described in the previous Examples were used to make reactive oligomeric compositions and composites of high strength. The compositions and physical property data for the resulting composites are shown in Tables 1, 2 and 3. For these Examples the oligomer was dissolved in the bismaleimide/reactive diluent mixture at about 60 to about 100° C. and coated onto Hercules Magnamite ® IM-7 carbon fiber using a prepreg machine so that the fiber constituted about 60 to about 70 volume percent and the oligomer/reactive mixture constituted about 30 to about 40 volume percent of the prepreg. The individual coated carbon fiber layers were then layed up and cured by conventional vacuum bag techniques at 180° C. for two hours, 230° C. for two hours, and 250° C. for 5 hours at 80 psi.

EXAMPLE 21

Preparation Of Amine Terminated Imide Oligomer Reacted With Sorboyl Chloride And Physical Property Determination Compared To Composite Without Terminally Unsaturated Oligomer A reactive imide oligomer was made as described in Example 3 on a 100 lb. scale. Fifteen (15) weight percent of this material was added to a mixture of 39.5% phenylenebismaleimide and 54.5% 2,2-bis(3-alkenyl-4-hydroxyphenyl) propane (a 1:1 mole ratio). The reactive imide oligomer was dissolved in the bismaleimide/-

TABLE 1

EXAMPLES 6-11[4]

| Prepreg Sample[1] | Example 6 | Example 7 | Example 8 | Example 9 | Example 10 | Example 11 |
|---|---|---|---|---|---|---|
| % Oligomer | 25% Example 1 | 20% Example 1 | 15% Example 1 | 14.4% Example 1 | 12.7% Example 1 | 13.1% Example 1 |
| Reactive Diluent/Multifunctional-maleimide | 75%[2] | 80%[2] | 85%[2] | 85.6[2] | 87.3[3] | 86.9[3] |
| Tack After Prepregging | No | No | Yes | Yes | Marginal | Marginal |
| Tg, °C. Cured Composite | 243 | 249 | 253 | 248 | 255 | 237 |
| PIC (Avg) Ksi (at 1500 lbs-in/in$^2$) | 30.9 | 26 | 28 | 23.2 | 23.6 | 24.9 |
| 0° Flex Strength Ksi | | | | | | |
| RT | 267 | 292 | 273 | 286 | 244 | 270 |
| 375° F. | 174 | 182 | 187 | 172 | 162 | 177 |
| 0° Flex Modulus, MSI | | | | | | |
| RT | 21 | 23 | 21.3 | 22.5 | 20.8 | 20 |
| 375° F. | 22 | 22 | 21.7 | 21.9 | 20.3 | 20 |
| Short Beam Shear, Ksi | | | | | | |
| RT | 18.7 | 18.3 | 19.1 | 14 | 16.7 | 16.8 |
| 375° Dry | 9.8 | 10.3 | 9.9 | 8.6 | 9.1 | 9.1 |
| 375° Wet | 7.0 | 6.8 | 6.7 | 6.0 | 6.5 | 6.3 |
| Tg | 243 | | 253 | | | |
| $K_{IC}$ | 1.4 | | 1.1 | | | |

[1]Prepreg prepared with 70% carbon fiber and 30% mixture of oligomer, reactive diluent, and multifunctional-maleimide mixture.
[2]1:1 molar mixture of benzenebismaleimide and bis 2,2(3 alkenyl-4-hydroxyphenyl) propane.
[3]54/46% molar mixture of 2,2(alkenyl-4-hydroxyphenyl) propane and p-diphenylmethanebismaleimide respectively.
[4]All examples in this table exhibit phase separated morphology.

TABLE 2

EXAMPLES 12-15[3]

| Prepreg Sample | Example 12 | Example 13 | Example 14 | Example 15 |
|---|---|---|---|---|
| % Oligomer | 15% Example 3 | 20% Example 3 | 25% Example 3 | 15% Example 3 |
| Reactive Diluent To Multifunctional-maleimide | 85%[1] | 80%[2] | 75% | 85%[2] |
| Tg, °C. Cured Composite | 244 | 237 | 242 | 261 |
| $K_{IC}$ | 1.3 | — | — | 1.0 |
| Tack | Good | Poor | Poor | Fair |

[1]1:1 molar mixture of benzenebismaleimide and 2,3 bis(3 alkenyl-4-hydroxyphenyl) propane.
[2]1.16/1 molar mixture of p-diphenylmethanebismaleimide and 2,2 bis(3 alkenyl-4-hydroxyphenyl) propane.
[3]All examples in this table exhibit phase separated morphology.

reactive diluent mixture at 60° C. and coated onto carbon fiber using a prepreg machine so that the fiber

TABLE 3

EXAMPLES 16-20[5]

| Prepreg Sample | Example 16 | Example 17 | Example 18 | Example 19 | Example 20 |
|---|---|---|---|---|---|
| % Oligomer | 15% Example 3 | 15% Example 3 | 15% Example 2 | 15% Example 4 | 15% Example 5 |
| Reactive Diluent To Multifunctional-maleimide | 85%[1] | 85%[2] | 85%[3] | 85%[4] | 85%[4] |
| Tg, °C. Cured Composite | 212 | 218 | 205 | 250 | 225 |
| $K_{IC}$ | — | — | 1.4 | 1.3 | 1.1 |
| Tack | Excellent | Good | Good | Good | Good |

[1]0.88/1 molar mixture of benzenebismaleimide to diallylbenzene.
[2]1:1 mole mixture of p-diphenylmethanebismaleimide and diallyl benzene.
[3]0.94/1 molar mixture of benzene bismaleimide to mixture of 57 weight % 2,2 (3 alkenyl-4-hydroxyphenyl) propane and 43% diallyl benzene.
[4]1:1 molar ratio of benzene bismaleimide and 2,2 (3 alkenyl-4-hydroxyphenyl) propane.
[5]All examples in this table exhibit phase separated morphology.

constituted about 60 to about 70 volume percent and the oligomer/reactive mixture constituted about 30 to about 40 volume percent of the prepreg. At the same time a 1:1 molar mixture of phenylenebismaleimide and 2,2-bis(3-alkenyl-4-hydroxyphenyl) propane without oligomer was coated onto a fabric in the same monomer as the oligomer composition. The individual coated Hercules Magnamite® IM-7 carbon fiber layers of each material were then layed up using 32 ply quasiesotropic laminates. The laminates were cured at 350° F. for 2 hours at 80 psi and under vacuum and then at 450° F. under free standing conditions. The results are recorded in Table 4. The oligomer containing material did not undergo stress cracking.

A sample of the reactive oligomer composition of this Example, i.e. a sample without carbon fiber, was cured, sectioned and stained as described in this invention. The resulting photomicrograph showing phase separated morphology is shown by FIG. 1. The lighter areas indicate the continuous phase. The dark areas indicate the discontinuous phase.

TABLE 4

EXAMPLE 21

| | | Oligomer Containing Material | Non-Oligomer Containing Material |
|---|---|---|---|
| Neat Resin Properties | Wet Tg, °C. | 219 | 210 |
| | $K_{IC}$ MPam$^{\frac{1}{2}}$ | 1.35 | 0.8 |
| Carbon Fiber Composite Properties | PIC ksi at 1500 in pound/in thickness | 35.8 | 10 |

What is claimed is:

1. A thermosetting resin composition comprising a mono- or multifunctional maleimide, a terminally unsaturated polyimide, polyamide or polyimideamide oligomer and a reactive diluent, said mono- or multi-functional maleimide having the formula

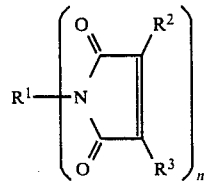

where $R^1$ is the residium of an aryl, alkylaryl, or alkylamine; $R^2$ is hydrogen, halogen, aryl, or lower alkyl group of from 1 to about 10 carbon atoms; $R^3$ is hydrogen, halogen, aryl or lower alkyl group of from 1 to about 10 carbon atoms; and n is an integer of from 1 to about 10; said terminally unsaturated polyimide, polyamide or polyimideamide oligomer prepared by reaction of (a) a diamine or mixture thereof selected from the group consisting of the formulae

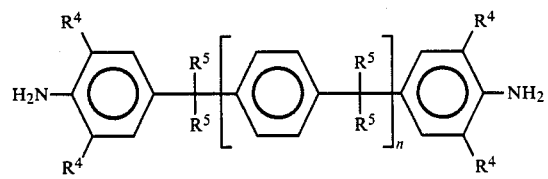

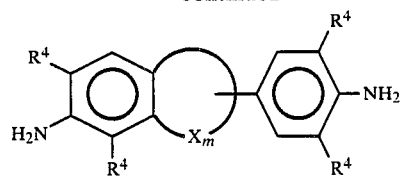

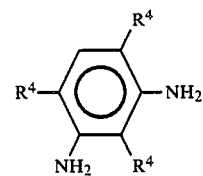

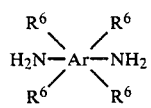

where $R^4$ is an alkyl, aryl, alkylaryl, halogen or hydrogen; $R^5$ is methyl or lower alkyl; n is 0 to 4; x is methylene and m is 3 to 6; Ar is aryl or alkylaryl; and $R^6$ is alkyl, aryl, arylalkyl, or halogen and the four $R^6$ groups are on adjacent carbon atoms to the two amine groups and such $R^6$ groups may be the same or different; (b) a dicarboxylic acid or reactive derivative thereof or mixture thereof and (c) an unsaturated organic compound having a group reactive with whichever of (a) or (b) is used in excess wherein if (a) is used in excess then said unsaturated organic compound is selected from maleic anhydride, its halide, alkyl, alkylaryl or aryl derivative; unsaturated alkyl halide; unsaturated acid chloride; unsaturated phosphonic halide; unsaturated isocyanate and unsaturated sulfonyl chloride; and if (b) is used in excess then said unsaturated organic compound is selected from unsaturated primary or secondary amine, unsaturated alcohol and unsaturated sulfide; and said reactive diluent being soluble in the mixture of said oligomer and said maleimide and selected from materials having formula VI or VII, below:

(a) 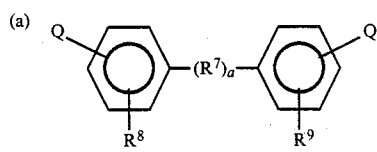

(b) 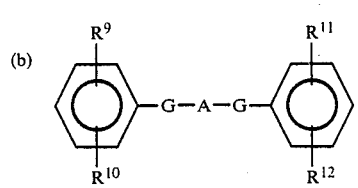

wherein in formula VI $R^7$ represents one of the radical

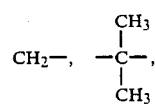

—SO$_2$—, —SO—, —S— and —O—; a is 0 to 1; and each Q is independently —OH, —NH$_2$, —SH, or hydrogen, and are the same or different and $R^8$ and $R^9$ are unsaturated alkyl groups having one to eight carbon atoms and may be the same or different, and wherein the Formula VII, $R^9$ and $R^{11}$ are unsaturated alkyl or aryl groups and may be the same or different, $R^{10}$ and $R^{12}$ are hydrogen, or alkyl or aryl ether groups; each Q is independently —OH, —NH₂, —SH or hydrogen and G is —O— or —S—or —NH—, and A is the residium of a dihalide, said composition being a liquid at 60° to 100° C. with a viscosity of between about 10,000 and 100,000 centipoises (cps) at 100° C.

2. A thermosetting polyimide composition of claim 1, wherein said terminally unsaturated oligomer comprises a polyimide oligomer which is the reaction, product of p-bis-(4-isopropylidene 2,6-dimethylaniline)benzene and 3,3′4,4′-benzophenonetetracarboxylic dianhydride reacted with sorboyl chloride.

3. A thermosetting polyimide composition of claim 1, wherein said terminally unsaturated oligomer comprises a polyimide oligomer which is the reaction product of p-bis-(4-iso-propylidene 2,6-dimethylaniline-benzene and 3,3′,4,4′-benzophenonetetracarboxylic dianhydride reacted in the presence of 2-isopropenylanilane.

4. A thermosetting composition of claim 3, wherein said multi-functional-maleimide comprises benzene bismaleimide.

5. A thermosetting composition of claim 1, wherein said multi-functional-maleimide comprises diphenylmethanebismaleimide.

6. A thermosetting composition of claim 1, wherein said reactive diluent comprises 2,2-(3-alkenyl-4-hydroxyphenyl) propane.

7. A thermosetting composition of claim 1, wherein said reactive diluent comprises 3,3′-diallyl-2,2′-dihydroxybiphenyl and its positional and unsaturated isomers.

8. A thermosetting composition, of claim 1, wherein said reactive diluent comprises 4,4′-bis-(o-propenylphenoxy)-diphenyl sulfone.

9. A thermosetting composition in accordance with claim 1, wherein said diamine or mixture thereof is reacted in excess over the amount of said dicarboxylic acid or derivative so as to form said terminally unsaturated polyimide oligomer when said unsaturated organic compound is reacted therewith.

* * * * *

UNITED STATES PATENT AND TRADEMARK OFFICE
CERTIFICATE OF CORRECTION

PATENT NO. : 4,946,908

DATED : AUGUST 7, 1990

INVENTOR(S) : CHU, JABLONER & NGUYEN

It is certified that error appears in the above-identified patent and that said Letters Patent is hereby corrected as shown below:

Column 4, Line 46

"or from" should read --of from--

Column 6, Line 33,34

"anhydride-acidchloride" should read --anhydride acid chloride--

Column 6, Line 36

"anhydride-acid" should read --anhydride acid--

Column 7, Line 40

"prefered" should read --preferred--

Column 8, Line 5

"3,5 hexadienylisocyanate" should read --3,5-hexadienylisocyanate--

UNITED STATES PATENT AND TRADEMARK OFFICE
CERTIFICATE OF CORRECTION

PATENT NO. : 4,946,908

DATED : AUGUST 7, 1990

INVENTOR(S) : CHU, JABLONER & NGUYEN 1

It is certified that error appears in the above-identified patent and that said Letters Patent is hereby corrected as shown below:

Column 9, Line 29

"when the fiber, is carbon fiber"   should read
-- when the fiber is carbon fiber, --

Column 9, Line 52

"For example"   should read   --For example,--

Column 10, Line 12

"prefered"   should read   --preferred--

Column 14, Line 18

"Amidimide"   should read   --Amideimide--

UNITED STATES PATENT AND TRADEMARK OFFICE
CERTIFICATE OF CORRECTION

PATENT NO. : 4,946,908

DATED : AUGUST 7, 1990

INVENTOR(S) : CHU, JABLONER & NGUYEN 1

It is certified that error appears in the above-identified patent and that said Letters Patent is hereby corrected as shown below:

Column 14, Line 53

"added the"  should read  --added and the--

Column 17, Lines 9,10

"quasiesotropic"  should read  --quasiisotropic--

Column 19, Line 16

" 3,3'4,4'- "  should read  -- 3,3',4,4'- --.

UNITED STATES PATENT AND TRADEMARK OFFICE
CERTIFICATE OF CORRECTION

PATENT NO. : 4,946,908

DATED : AUGUST 7, 1990

INVENTOR(S) : CHU, JABLONER & NGUYEN 1

It is certified that error appears in the above-identified patent and that said Letters Patent is hereby corrected as shown below:

Column 11, Line 36

" $\dfrac{3\, P^2_{IC} M^2\, (I + v)}{T_C T^{3w}}$ " should read -- $\dfrac{3\, P_{IC}^{\ 2} M^2\, (I + v)}{T_C T^{3w}}$ --

Column 15, Line 49 (Table 2)

"and 2,3 bis" should read --and 2,2 bis--

UNITED STATES PATENT AND TRADEMARK OFFICE
CERTIFICATE OF CORRECTION

PATENT NO. : 4,946,908

DATED : AUGUST 7, 1990

INVENTOR(S) : CHU, JABLONER & NGUYEN 1

It is certified that error appears in the above-identified patent and that said Letters Patent is hereby corrected as shown below:

Column 18, Line 59

"radical" should read --radicals--

Column 19, Line 14

"reaction,," should read --reaction--

Column 20, Line 14

"composition, of" should read --composition of--.

Signed and Sealed this

Fifteenth Day of June, 1993

Attest:

MICHAEL K. KIRK

Attesting Officer

Acting Commissioner of Patents and Trademarks